US011514035B1

(12) United States Patent
Heiler et al.

(10) Patent No.: US 11,514,035 B1
(45) Date of Patent: Nov. 29, 2022

(54) QUERY REFINEMENTS USING SEARCH DATA

(71) Applicant: Google LLC, Mountain View, CA (US)

(72) Inventors: Matthias Heiler, Zürich (CH);
Behshad Behzadi, Freienbach (CH);
Evgeny A. Cherepanov, Adliswil (CH);
Nils Grimsmo, Adliswil (CH);
Aurelien Boffy, Basel (CH);
Alessandro Agostini, Zürich (CH);
Karoly Csalogany, Zürich (CH);
Fredrik Bergenlid, Zürich (CH);
Marcin M. Nowak-Przygodzki, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 255 days.

(21) Appl. No.: 16/889,166

(22) Filed: Jun. 1, 2020

Related U.S. Application Data

(63) Continuation of application No. 15/617,184, filed on Jun. 8, 2017, now Pat. No. 10,691,680, which is a
(Continued)

(51) Int. Cl.
*G06F 16/242* (2019.01)
*G06F 16/23* (2019.01)
(Continued)

(52) U.S. Cl.
CPC ............ *G06F 16/243* (2019.01); *G06F 16/23* (2019.01); *G06F 16/248* (2019.01);
(Continued)

(58) Field of Classification Search
CPC .. G06F 16/243; G06F 16/23; G06F 16/90328; G06F 16/24575; G06F 16/9535; G06F 16/248; G06F 16/2436
See application file for complete search history.

(56) References Cited

U.S. PATENT DOCUMENTS 6,567,810 B1  5/2003 Singhal
7,444,324 B2  10/2008 Ortega et al.
(Continued)

FOREIGN PATENT DOCUMENTS

CN       102968480 A    3/2013
WO    WO 2010/049582    5/2010

OTHER PUBLICATIONS

"Apple—iOS 6—User your voice to do even more with Siri," downloaded from the internet on Apr. 29, 2013, http://www.apple.com/ios/siri/, 3 pages.
(Continued)

*Primary Examiner* — Etienne P Leroux
(74) *Attorney, Agent, or Firm* — Middleton Reutlinger

(57) ABSTRACT

Methods, systems, and apparatus, including computer programs encoded on a computer storage medium, for determining query refinements using search data. In one aspect, a method includes receiving a first query and a second query each comprising one or more n-grams for a user session, determining a first set of query refinements for the first query, determining a second set of query refinements from the first set of query refinements, each query refinement in the second set of query refinements including at least one n-gram that is similar to an n-gram from the first query and at least on n-gram that is similar to an n-gram from the second query, scoring each query refinement in the second set of query refinements, selecting a third query from a group consisting of the second set of query refinements and the second query, and providing the third query as input to a search operation.

20 Claims, 4 Drawing Sheets

Related U.S. Application Data continuation of application No. 14/813,237, filed on Jul. 30, 2015, now Pat. No. 9,727,603, which is a continuation of application No. 13/906,889, filed on May 31, 2013, now Pat. No. 9,116,952.

(51) Int. Cl.
  *G06F 16/9032* (2019.01)
  *G06F 16/2457* (2019.01)
  *G06F 16/9535* (2019.01)
  *G06F 16/248* (2019.01)

(52) U.S. Cl.
  CPC .... *G06F 16/2425* (2019.01); *G06F 16/24575* (2019.01); *G06F 16/90328* (2019.01); *G06F 16/9535* (2019.01)

(56) References Cited

U.S. PATENT DOCUMENTS

| | | | |
|---|---|---|---|
| 8,019,748 B1 * | 9/2011 | Wu | G06F 16/3347 707/713 |
| 8,065,316 B1 | 11/2011 | Baker et al. | |
| 8,086,619 B2 | 12/2011 | Haahr | |
| 8,135,729 B2 | 3/2012 | Brewer | |
| 8,145,623 B1 | 3/2012 | Mehta et al. | |
| 8,423,538 B1 | 4/2013 | Sadikov et al. | |
| 8,688,727 B1 | 4/2014 | Das et al. | |
| 8,762,392 B1 | 6/2014 | Yamauchi | |
| 9,336,277 B2 | 5/2016 | Behzadi et al. | |
| 2002/0129012 A1 | 9/2002 | Green | |
| 2003/0023440 A1 | 1/2003 | Chu | |
| 2008/0082477 A1 | 4/2008 | Dominowska et al. | |
| 2009/0089251 A1 | 4/2009 | Johnston et al. | |
| 2009/0112816 A1 | 4/2009 | Marlow | |
| 2010/0030769 A1 | 2/2010 | Cao et al. | |
| 2010/0299343 A1 | 11/2010 | Ahari et al. | |
| 2010/0318551 A1 | 12/2010 | Lai | |
| 2011/0087686 A1 | 4/2011 | Brewer et al. | |
| 2011/0191329 A1 | 8/2011 | Petrov | |
| 2011/0202533 A1 | 8/2011 | Wang et al. | |
| 2011/0270819 A1 * | 11/2011 | Shen | G06F 16/9535 707/777 |
| 2012/0253802 A1 | 10/2012 | Heck et al. | |
| 2012/0259829 A1 | 10/2012 | Zhou | |
| 2013/0282704 A1 | 10/2013 | Pantel et al. | |
| 2013/0326353 A1 | 12/2013 | Singhal | |
| 2014/0081633 A1 | 3/2014 | Badaskar | |

OTHER PUBLICATIONS

"Google Beats Siri to the Desktop with Google Now-like voice search for Chrome," downloaded from the internet on May 15, 2013, http://9to5mac.com/2013/05/15/google-beats-siri-to-tbe-desktop-with-google-now-like-voice-search-for-chrome/, 4 pages.

"Google Now. The right information at just the right time," downloaded from the internet on Apr. 29, 2013, http://www.google.com/landing/now/, 4 pages.

CN Office Action issued in Chinese Application No. 201480031285.3, dated Aug. 3, 2018, 28 pages (with English Translation).

EP Summons to Attend Oral Proceedings issue in Application No. 14734599.5, dated Apr. 5, 2018, 8 pages.

International Search Report and Written Opinion in International Application No. PCT/US2014/038743, dated Sep. 5, 2014, 11 pages.

* cited by examiner

QUERY REFINEMENTS USING SEARCH DATA

CROSS-REFERENCE TO RELATED APPLICATION

This application is a continuation of U.S. application Ser. No. 15/617,184, filed Jun. 8, 2017, which is a continuation of U.S. application Ser. No. 14/813,237, filed Jul. 30, 2015, which is a continuation of U.S. application Ser. No. 13/906,889, filed May 31, 2013, the contents of which are incorporated by reference.

BACKGROUND

This specification relates to systems receiving sequential queries during a single user session and determining query refinements based on the sequence of queries.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the users informational needs. The search queries are usually in the form of text, e.g., one or more query terms, and may also include transcriptions of spoken search queries. The search system selects and scores resources based on their relevance to the search query and on their importance relative to other resources to provide search results. The search results are typically ordered according to the scores and presented according to this order.

SUMMARY

This specification describes technologies relating to the generation and selection of query refinements using query data.

In general, one innovative aspect of the subject matter described in this specification can be embodied in methods that include the actions of receiving, by one or more computers, a first query comprising one or more n-grams for a user session, receiving, by the one or more computers, a second query comprising one or more n-grams for the user session, the second query being different from the first query and subsequent to the first query without an intervening query, determining an first set of query refinements for the first query, each of the query refinements in the first set of query refinements based on the first query, determining a second set of query refinements from the first set of query refinements, each query refinement in the second set of query refinements including at least one n-gram that is similar to an n-gram from the first query and at least on n-gram that is similar to an n-gram from the second query, scoring each query refinement in the second set of query refinements, selecting, based on the score, a third query, the third query selected from a group consisting of the second set of query refinements and the second query, and providing the third query as input to a search operation. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. In some implementations, a search engine accesses multiple sequential queries and determines a query refinement for a received query based on the multiple sequential queries, thereby reducing the amount of user input on a user device. In some implementations, the search engine restricts query refinements to reduce the likelihood of topic drift, thereby providing refinements that are more likely to satisfy users' informational needs. The ability to refine a query in this manner enables a user to input queries in a more fluid, conversational manner, which, in turn, results in ease of use of the search engine by the users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§ 1.0 Overview

Sometimes when a modification to a query is desired it may be difficult for a user to enter a new query or modify the currently entered query. For example, a user with a mobile device may find it more time consuming to speak or type a new search query based on a previous query than speaking or typing a related query that could be combined with a first query. An example is a first voice input query "restaurants in San Francisco" followed by a second query "I was thinking Italian today".

When two sequential queries are received during a single session, a search system selects query refinements based on a first set of queries and a second set of queries. The first set of queries includes query refinements to the first query in the sequence, and the second set of queries is a subset of the first set of queries. The second set of queries is selected based on the terms of the first query and a second query in the sequence of received queries. From this second set of query refinements a query is selected for the user session.

For example, the system selects query refinements based on a first query of "restaurants in San Francisco," such as the query refinements "restaurants in New York," "Italian restaurants in San Francisco," "restaurants in the Bay Area," and "French restaurants in San Francisco." Using a second query of "Italian restaurants," the system selects the refinement that is most likely to be next in the sequence based on the first and second queries, in this case "Italian restaurants in San Francisco," and provides search results responsive to "Italian restaurants in San Francisco" to a user.

§ 1.1 Example Operating Environment

Figure 1A:
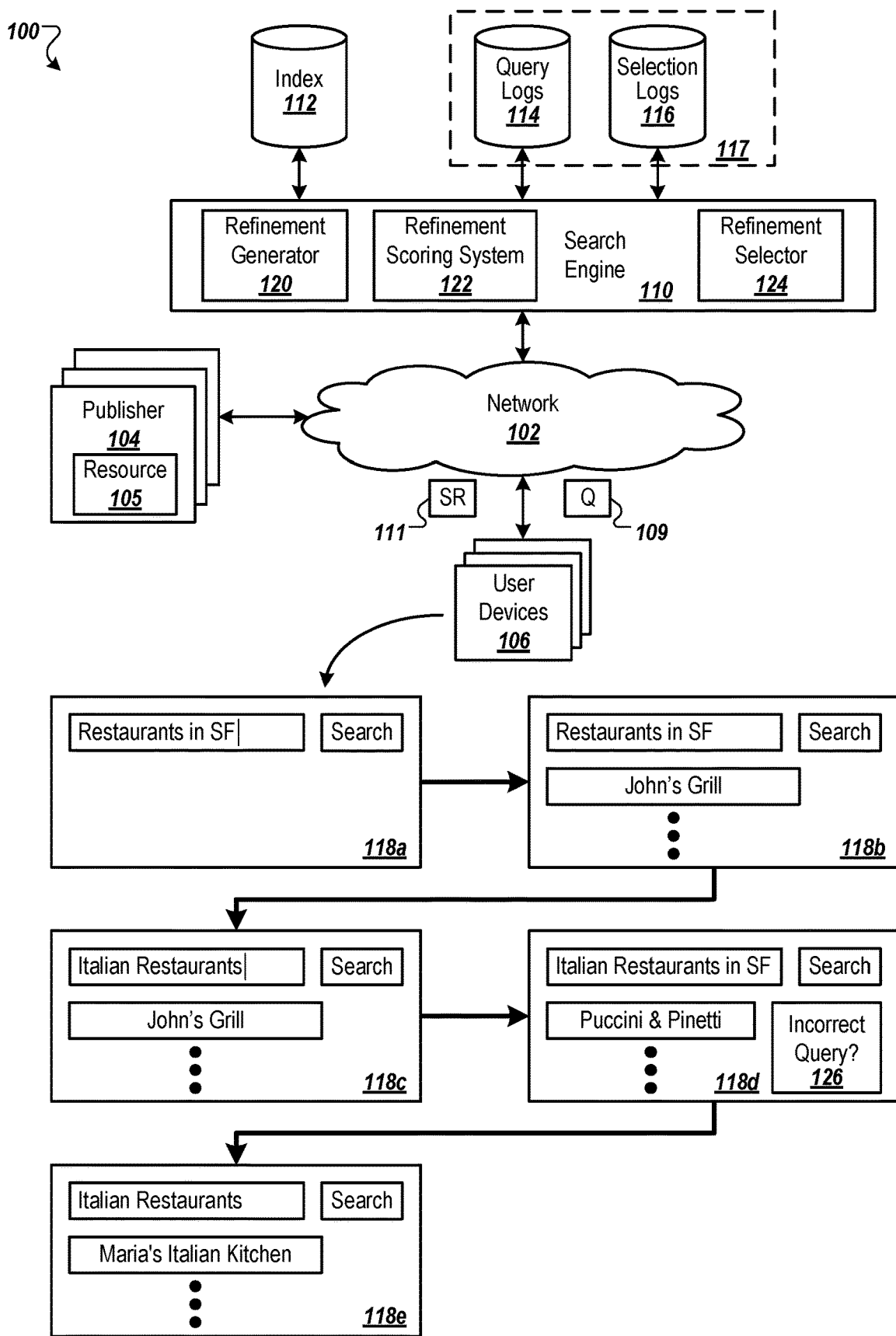
FIGS. 1A-B are block diagrams of an example environment for determining search refinements.

FIG. 1A is a block diagram of an example environment 100 for determining search refinements. The search refinements are determined based on two sequential queries to provide a user session with updated search results.

A computer network 102, such as a local area network (LAN), wide area network (WAN), the Internet, or a combination thereof, connects publisher websites 104, user devices 106, and a search engine 110. The online environment 100 may include many thousands of publisher websites 104 and user devices 106.

A publisher web site 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each publisher website 104 is maintained by a content publisher, which is an entity that controls, manages and/or owns the publisher website 104.

A resource is any data that can be provided by a publisher website 104 over the network 102 and that has a resource address, e.g., a uniform resource locator (URL). The resources 105 may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the World Wide Web or a local area network.

To facilitate searching of these resources 105, the search engine 110 identifies the resources by crawling the publisher websites 104 and indexing the resources 105 provided by the publisher websites 104. The resources 105 are indexed and the index data are stored in an index 112.

The user devices 106 submit search queries 109 to the search engine 110. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in a search results page resource 111. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages 111 and render the pages for presentation to users. In response to the user selecting a search result at a user device 106, the user device 106 requests the resource 105 identified by the resource locator included in the selected search result. The publisher of the publisher website 104 hosting the resource 105 receives the request for the resource from the user device 106 and provides the resource 105 to the requesting user device 106.

In some implementations, the search queries 109 submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices 106, the actions taken in response to the queries, and how often the queries have been submitted.

The search engine 110 uses the query logs 114 to determine sequences of queries submitted by the user devices 106 during individual search sessions. For example, the search engine may use the query logs 114 to determine that after receiving a query for "restaurants in San Francisco" in a search session, the search engine sometimes receives queries for "Italian restaurants in San Francisco," "French restaurants in San Francisco," and "cafes in San Francisco," to name a few.

The search engine 110 uses these sequences of queries to determine query refinements made to search queries during search sessions. For example, the search engine 110 determines that a user may modify an initial search query with a cuisine type, such as French, and Italian, or with a price range, to name a few.

§ 1.2 Query Refinements

The search engine 110 uses these query refinements to determine query refinements for later search sessions. For example, when a user enters a first search query of "Restaurants in San Francisco" in a user interface 118a during a search session and the user's device 106 provides the first search query to the search engine 110, the search engine 110 selects search results responsive to the search query and provides a search results page to the user's device 106, and the user's device 106 presents the search results in a user interface 118b, including the result for "John's Grill."

When a second query for "Italian Restaurants" is entered in a user interface 118c during the same search session, and the second query is provided to the search engine 110 and a refinement generator 120 selects query refinements for the first query using the query logs 114, where the query refinements are based on modifications made to the first query during previous search sessions. For example, the refinement generator 120 selects the query refinements "Italian restaurants in San Francisco," "French restaurants in San Francisco," and "cafes in San Francisco."

A refinement scoring system 122 scores each of the selected query refinements based on n-grams that appear in query refinements which are similar to n-grams in the first query or in the second query. A refinement selector 124 selects the query refinement with the highest score, where the query refinement with the highest score is most likely to be next in the query sequence for the user session based on the first and second queries. For example, the refinement scoring system 122 assigns the query refinement "Italian restaurants in San Francisco" with the highest score and the query refinements "French restaurants in San Francisco" and "cafes in San Francisco" with lower scores. The refinement scoring system 122 may assign the query refinement "Italian restaurants in San Francisco" with the highest score based on the query refinement containing a majority of the words or similar words from the first query and the second query compared to the other query refinements. In other examples, the query refinement with the highest score has the greatest similarity to the first and second queries or has the greatest similarity to either the first query or the second query but not both, to name a few.

The search engine 110 selects search results responsive to the query refinement with the highest score and provides the search results to the user's device 106. The search engine 110 may provide the query refinement with the highest score to the user's device 106 with the search results. For example, the search engine determines that the restaurant "Puccini & Pinetti" is Italian and located in San Francisco and provides the search result "Puccini & Pinetti" and the query refinement "Italian restaurants in San Francisco" to the user's device 106.

The user's device 106 presents the search result "Puccini & Pinetti" in a user interface 118d and may replace the second query of "Italian Restaurants" with the query refinement "Italian Restaurants in SF" in a query input field to indicate that the search result "Puccini & Pinetti" is responsive to the query refinement "Italian Restaurants in SF" instead of the second query "Italian Restaurants." Alternatively, the second query "Italian Restaurants" remains in the query input field.

The user interface 118d may include an incorrect query option 126 which, upon selection, indicates that the query refinement is incorrect and the user wants search results responsive only to the second query. For example, when the search engine 110 receives an indication that the incorrect query option 126 has been selected, the search engine 110 determines search results responsive to the second query "Italian Restaurants" including a search result for the restaurant "Maria's Italian Kitchen" and provides the search results to the user's device 106. The difference in the search results is due to the difference in the scoring of the resources for the respective search queries "Italian Restaurants in SF" and "Italian Restaurants."

The user's device 106 presents the search results, including the search result for the restaurant "Maria's Italian Kitchen," in a user interface 118e along with the second query "Italian Restaurants" in a query input field in the user interface 118e.

In an alternate implementation, the search engine 110 may provide results for the query "Italian Restaurant" first, and provide the user with the option to revise the query to "Italian Restaurants in SF."

§ 2.0 Example System Process Flow

Figure 1B:
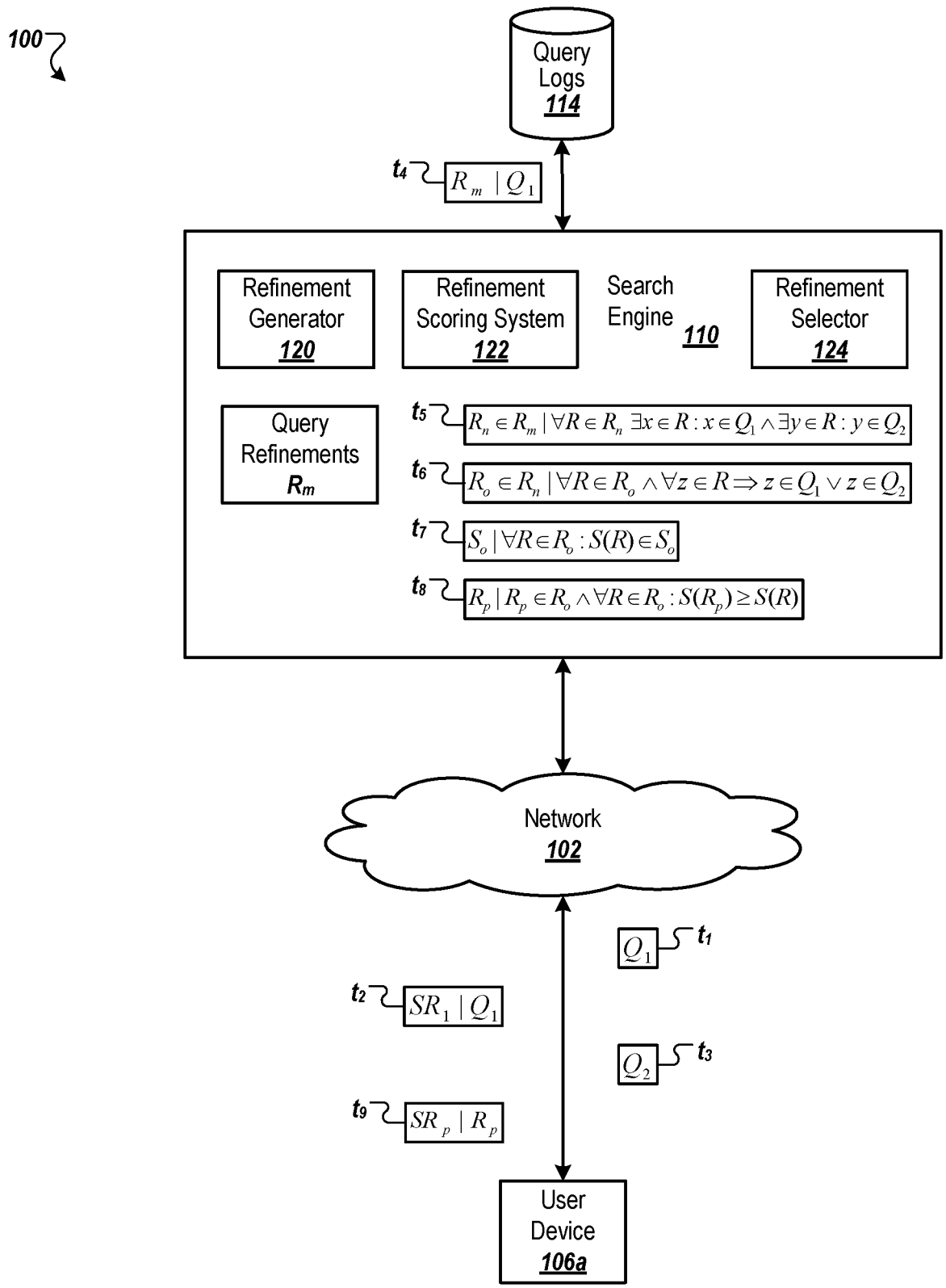

FIG. 1B is a more detailed illustration for a query refinement flow at query time. While the operations described below are described as occurring at query time, in some implementations, many of the operations may be performed prior to query time. For example, most popular sequences of queries in sessions may be processed to identify refinements prior to query time. Then, when a matching sequence of queries is received, the query refinement previously determined for that sequence can be used. However, for illustrative purposes, the processes below are described as occurring at query time.

In FIG. 1B, a user device 106a provides the search engine 110 with a first query $Q_1$ at time $t_1$. For example, the first query $Q_1$ is "Restaurants in San Francisco."

At time $t_2$, the search engine 110 provides the user device 106a with search results $SR_1$ which are responsive to the first query $Q_1$. For example, the user device 106a receives the search results $SR_1$ and presents the search results to a user.

During the same search session as the first query $Q_1$ received at time $t_1$, the search engine 110 receives a second query $Q_2$ from the user device 106a at time $t_3$ and, at time $t_4$, the refinement generator 120 retrieves a first set of query refinements $R_m$ based on the first query $Q_1$ from the query logs 114 and stores the query refinements $R_m$ in a memory (e.g., on the same computer or computers as the refinement generator). For example, the second query $Q_2$ is "Italian restaurants" and the refinement generator 120 determines that the first set of query refinements $R_m$ of the first query $Q_1$ include "Italian restaurants in the Bay Area," "French restaurants in San Francisco," "Restaurants in New York," "Restaurants in San Francisco," "cafes in San Francisco," and "San Francisco Giants" where each of the query refinements includes an n-gram similar to one of the n-grams "restaurants" or "San Francisco," which are in the first query $Q_1$. In some implementations, the first set of query refinements $R_m$ are selected based on queries that have been received by the search engine 110 after the first query $Q_1$ during prior user sessions, either with or without intervening queries.

The refinement generator 120, at time $t_5$, selects a second set of query refinements $R_n$. Each of the queries in the second set of query refinements $R_n$ are candidate query refinements selected from the first set of query refinements $R_m$, such that the second set of the query refinements $R_n$ is a proper subset of the first set of query refinements $R_m$. The refinement generator 120 selects the second set of query refinements $R_n$ such that each query refinement R in $R_n$ includes an n-gram x and an n-gram y, where the n-gram x is similar to an n-gram in the first query $Q_1$ and the n-gram y is similar to an n-gram in the second query $Q_2$. For example, the refinement generator 120 selects the query refinements "Italian restaurants in the Bay Area," "French restaurants in San Francisco," "Restaurants in New York," "Restaurants in San Francisco," and "cafes in San Francisco" as the query refinements $R_n$, discarding the query refinement "San Francisco Giants" which does not include an n-gram similar to an n-gram from the second query "Italian Restaurants". A variety of appropriate processes can be used to determine whether the n-grams are similar. For example, exact matches can be used, or expansions/synonyms can be used, etc.

In some implementations, the refinement generator 120 limits the candidate query refinements included in the second set of query refinements $R_n$. At time $t_6$, the refinement generator 120 may select a further subset of query refinements $R_o$, which is a proper subset of $R_n$, where for every query refinement R in the query refinements $R_o$, and for every n-gram z in R, z is similar to an n-gram in either the first query $Q_1$ or the second query $Q_2$. For example, the refinement generator 120 selects the query refinements "Italian restaurants in the Bay Area," "Restaurants in San Francisco," and "cafes in San Francisco" as the query refinements $R_o$, because the n-grams "New York," and "French"

from the other query refinements are not in either the first query $Q_1$ "Restaurants in San Francisco" or the second query $Q_2$ "Italian Restaurants."

The refinement scoring system 122 generates score $S_0$ for the query refinements $R_o$ at time $t_7$ such that each query refinement R in the query refinements $R_o$ is associated with a score, and the refinement selector 124, at time $t_8$, selects the query refinement $R_p$ from the query refinements $R_o$ where the query refinement $R_p$ has the highest score of all the query refinements in the query refinements $R_o$. For example, the refinement scoring system 122 assigns the query refinement "Italian restaurants in the Bay Area" with the highest score because the n-gram "restaurants in the Bay Area" is similar to the first query $Q_1$ "Restaurants in San Francisco" and the query refinement $R_p$ also includes the n-gram "Italian restaurants" from the second query $Q_2$.

The search engine 110 selects search results $SR_p$ responsive to the query refinement $R_p$ and, at time $t_9$, provides the search results $SR_p$ to the user device 106a. For example, the search engine provides search results responsive to the query refinement "Italian Restaurants in the Bay Area" to the user device 106a.

§ 3.0 Example Query Server Process Flows

Figure 2:
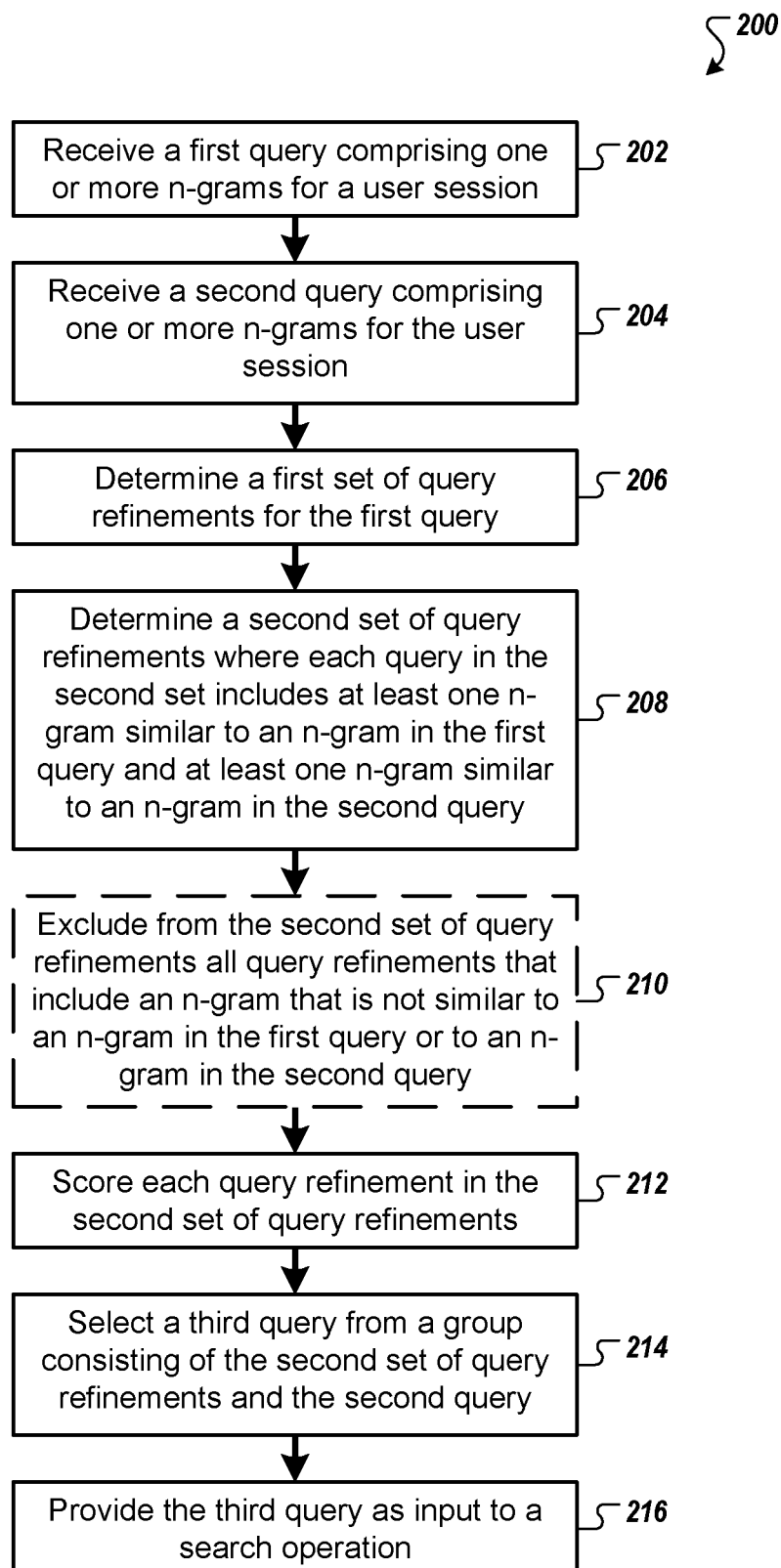
FIG. 2 is a flow diagram of a process for providing a query as input to a search operation.

FIG. 2 is a flow diagram of a process 200 for providing a query as input to a search operation. The process 200 can be used by the search engine 110 of FIGS. 1A-B to provide search results responsive to the query to a user device.

The process 200 receives a first query comprising one or more n-grams for a user session (202). For example, the search engine receives the first query $Q_1$ from a user device during the user session.

The process 200 receives a second query comprising one or more n-grams for the user session (204). The second query is different from the first query and subsequent to the first query without an intervening query during the search session. For example, during the same user session with the user device, the search engine receives the second query $Q_2$.

The process 200 determines a first set of query refinements for the first query (206). Each of the query refinements in the first set of query refinements is based on the first query. For example, the refinement generator selects and retrieves the query refinements $R_m$ from the query logs. Each query in the set $R_m$ is a query that was input as a refinement for the first query in a prior session. In some implementations, each query in the set $R_m$ is a query that was input after the first query and without an intervening query during a session.

The process 200 determines a second set of query refinements where each query in the second set includes at least one n-gram similar to an n-gram in the first query and at least one n-gram similar to an n-gram in the second query (208). The second set of query refinements is a proper subset of the first set of query refinements and each query refinement in the second set of query refinements includes at least one n-gram that is similar to an n-gram from the first query and at least one n-gram that is similar to an n-gram from the second query. For example, the refinement generator selects the query refinements $R_n$ based on the query refinements $R_m$. The similarity of n-grams can be based on exact matches, or more inclusive similarity measures.

The process 200 excludes from the second set of query refinements all query refinements that include an n-gram that is not similar to an n-gram in the first query or to an n-gram in the second query (210). For example, the refinement generator may determine the query refinements $R_o$ by excluding queries that include n-grams that are not similar to any of the n-grams in the first and second queries.

The process 200 scores each query refinement in the second set of query refinements (212). For example, the refinement scoring system scores each of the query refinements in the query refinements $R_o$ when the process 200 includes step 210, and in the query refinements $R_n$ when the process 200 does not include step 210.

The process 200 selects a third query from a group consisting of the second set of query refinements and the second query (214). For example, the refinement selector uses the scores related with each of the query refinements $R_o$ and, based on the scores, selects the query refinement with the highest score from the query refinements $R_o$ as the third query. Alternatively, if the step 210 was not performed, the refinement selector selects the query refinement with the highest score from the query refinements $R_n$ as the third query.

The process 200 provides the third query as input to a search operation (216). For example, the refinement selector provides the third query to the search engine. The search engine may determine one or more search results responsive to the third query and provide a search results page that includes the search results to the user device associated with the user session, as described above with reference to FIG. 1A.

The order of steps in the process 200 described above is illustrative only, and the selection of the third query can be done in different orders. For example, the process 200 may determine the first set of query refinements for the first query prior to receiving the first query. After receiving the first query and the second query, the process 200 would then retrieve the query refinements from a database of query refinements using the first and the second queries.

In some implementations, the process 200 can include additional steps, fewer steps, or some of the steps can be divided into multiple steps. For example, the search engine may perform the process 200 without excluding from the second set of query refinements all query refinements that include an n-gram that is not similar to an n-gram in the first query or to an n-gram in the second query. In one example, the search engine may receive the second query before receiving the first query, and perform the step 206 after receiving the first query.

In another example, the process 200 can determine whether the third query is the same as the second query after providing the third query as input to the search operation. If the third query is not the same as the second query, a search results page provided by the search engine to a user device can include a user interface element that allows a user to request search results responsive to the second query.

Figure 3:
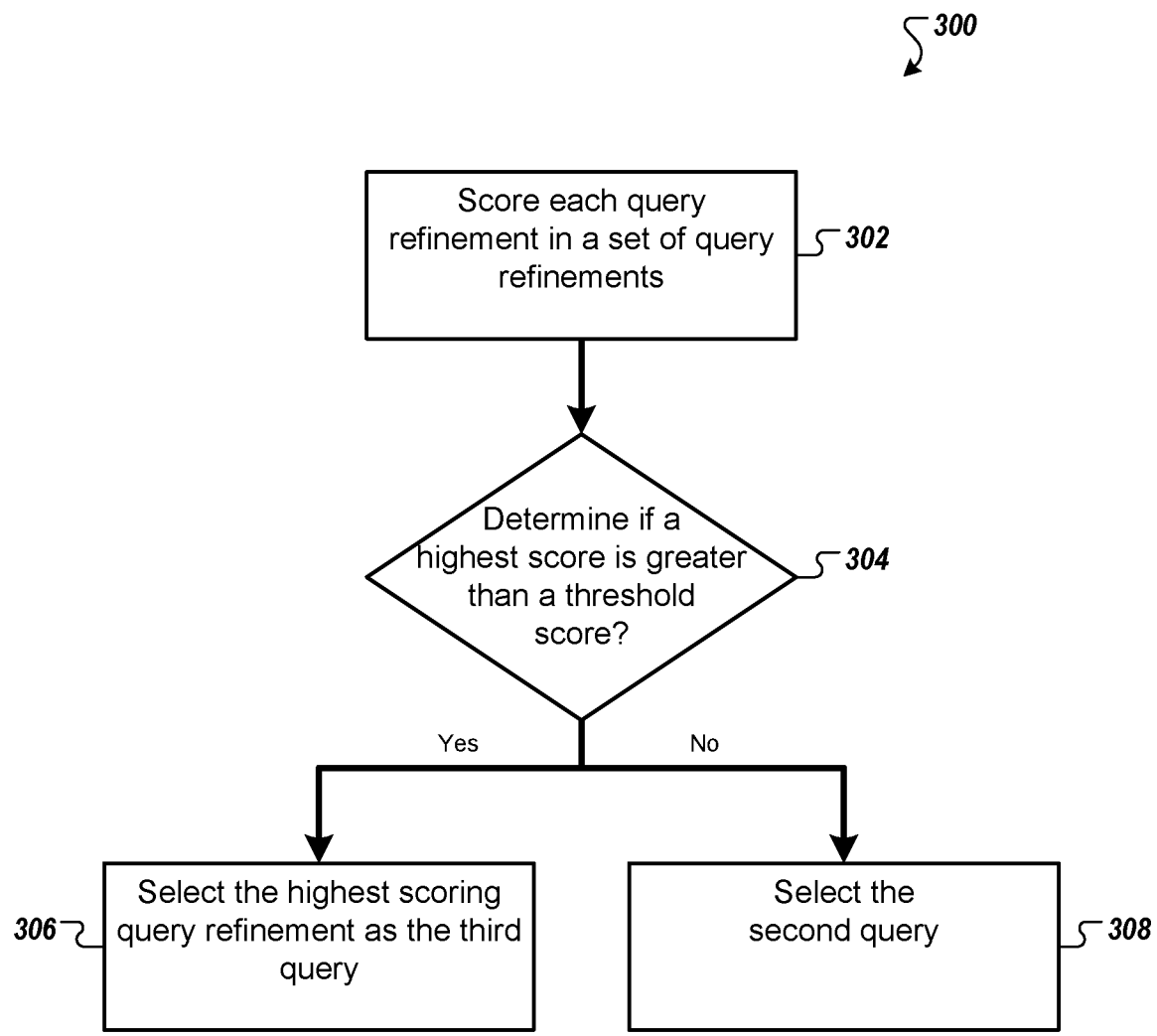
FIG. 3 is a flow diagram of a process for selecting a third query.

FIG. 3 is a flow diagram of a process 300 for selecting a third query. The process 300 can be used by the search engine 110 of FIGS. 1A-B to select the third query from the group consisting of the second set of query refinements and the second query. For example, when the search engine 110 performs the process 200, the search engine 110 can perform the process 300 instead of the steps 212 and 214.

The process 300 scores each query refinement in a set of query refinements (302). Each score for a specific query refinement is based on one or more query refinement n-grams that are similar to one or more first query n-grams or one or more second query n-grams. The query refinement n-grams are included in the specific query refinement, the first query n-grams are included in the first query, and the second query n-grams are included in the second query. For example, the refinement scoring system scores each query refinement R in the query refinements $R_o$ based on the similarity between the query refinements and the first and second queries or the likelihood that a particular query refinement follows the first and second queries. The refinement scoring system may associate a weight with each n-gram in a query refinement R where the weight values are used to determine the score for query refinement R.

The process 300 determines if a highest score is greater than a threshold score (304). The highest score is associated with the highest scoring query refinement in the set of query refinements. For example, the refinement selector compares the highest score associated with the query refinement $R_p$ with the threshold score.

If the highest score is greater than the threshold score, the process 300 selects the highest scoring query refinement as the third query (306). For example, when the refinement selector determines that the highest score is greater than the threshold score, the refinement selector selects the query refinement $R_p$, associated with the highest query refinement score, as the third query.

If the highest score is not greater than the threshold score, the process 300 selects the second query (308). For example, the refinement selector determines that none of the query refinements in the query refinements $R_o$ is similar both the first query $Q_1$ and the second query $Q_2$ or meet a threshold likelihood of following the first and second queries, and that the second query is not a refinement of the first query. The refinement selector selects the second query as the third query which can be used as input to a search operation.

In some implementations, the process 300 can include additional steps, fewer steps, or some of the steps can be divided into multiple steps. For example, as the process 300 scores each of the query refinements, the process 300 can compare the scores with the threshold score, and if a specific score is below the threshold score, the process 300 removes a specific query refinement associated with the specific score from the query refinements $R_o$.

§ 3.1 Additional Scoring and Selection Details

In some implementations, the refinement generator determines the first set of query refinements $R_m$ that contain n-grams that are similar to n-grams in the first query $Q_1$. For example, when the first query is "Restaurants in San Francisco," the refinement generator includes "Mexican restaurants in New York" and "French restaurants in Los Angeles" in the first set of query refinements $R_m$ based on San Francisco, New York, and Los Angeles belonging to the same semantic class. Here the refinement generator identifies a base query pattern of "restaurants in $city" where "$city" is a variable associated with a city semantic class that represents any city name that is included in a query from the query logs. When the refinement generator determines that a query matches the base query pattern based on an n-gram in the query belonging to a particular semantic class, the refinement generator includes the query in the first set of query refinements $R_m$.

This allows the search engine to receive any first query of the form "restaurants in $city" and select a third query using the first set of query refinements $R_m$. For example, the search engine may receive first queries "Restaurants in San Francisco" and "Restaurants in New York" followed by the same second query of "Italian restaurants," and use similar query refinements for both sequences of queries (e.g., "Italian restaurants in San Francisco" and "Italian restaurants in New York" respectively). Further, when a particular query does not have any query refinements, the search engine uses a pattern for that particular query to locate query refinements for similar queries that can also be used for the particular query, where the particular query and the similar queries each have an n-gram that belongs to the same semantic class.

In these implementations, the refinement generator may include query refinements that match the base query pattern in the second set of query refinements $R_n$.

In implementations when the refinement generator selects the further subset of query refinements $R_o$, the query refinements $R_o$ may include query refinements that match the base query pattern. For example, the refinement generator selects the subset of candidate query refinements $R_o$ from the second subset of query refinements $R_n$ where for every query refinement R in the query refinements $R_o$, and for every n-gram z in R, z is similar to an n-gram in either the first query $Q_1$ or the second query $Q_2$ or z corresponds to a variable in the base pattern (i.e., based on a semantic class of the n-gram z). For example, when the base query pattern is "restaurants in $city," the first query is "Restaurants in San Francisco" and the second query is "Italian restaurants," the refinement generator may include the query refinement "Italian restaurants in New York" in the candidate query refinements $R_o$.

In some implementations, the refinement generator may create query refinements from the first query and the second query where the created query refinements are not in the query logs. For example, when the first query is "Restaurants in San Francisco" and the second query is "Italian restaurants," the refinement generator may create the query refinements "Italian restaurants in San Francisco," "San Francisco Italian restaurants," "Italian in San Francisco," and "Restaurants Italian in San Francisco" and include these query refinements in the second set of query refinements $R_n$, where these query refinements may or may not be in the query logs.

In some implementations, when the refinement generator uses a base query pattern, the refinement generator scores the query refinements in the second set of query refinements $R_m$ based on whether the value of the variable in the query refinement is similar to the value from the first query or the second query. For example, when the first query is "Restaurants in San Francisco" and the second query is "Italian restaurants," the query refinement "Italian restaurants in San Francisco" will be associated with a higher score than the query refinements "Italian restaurants in Los Angeles" and "Restaurants in New York near union square" when the query refinements $R_m$ are ranked.

In some implementations, the similarity between the n-grams in the query refinements $R_n$ and the first and second queries is based on words or n-grams that are included in the first and second query that also appear in the query refinements, and/or on synonyms, abbreviations, alternate spellings, acronyms, expansions, or a different grammatical number for words that are included in the first and second query that also appear in the query refinements, to name just a few.

For example, when the first query $Q_1$ includes the n-gram "San Francisco" then one of the n-grams in the query refinements $R_n$ may include "SF" where "SF" is an abbreviation of "San Francisco" and "San Francisco" is an expansion of "SF." In another example, when one of the search queries includes the n-gram "restaurant," the refinement generator can include a query refinement with a different grammatical number such as "restaurants" (e.g., a plural term can be determined as similar to a singular term). In one example, the refinement generator 120 can include alternate spellings for n-grams, such as "check" for "cheque" or "analyse" for "analyze." Additionally, the refinement generator may include alternate spellings for n-grams that have similar meanings, such as "Constantinople" or "Byzantium" for "Istanbul" or "brother" for "family member."

In some implementations, the refinement generator or the search engine corrects errors in search queries. For example, the search engine can determine potential correct spellings for search queries before storing the search queries in the query logs and/or the refinement generator can use the potential correct spellings when determining the search refinements $R_m$.

In some implementations, each of the query refinement n-grams that are similar to one of the second query n-grams are associated with a greater weight value than one of the query refinement n-grams that is similar to one of the first query n-grams. For example, when the first query is "Restaurants in San Francisco" and the second query is "Italian restaurants," n-grams that are similar to "Italian" or "restaurants" are associated with a greater weight value than n-grams that are similar to "San Francisco."

In some implementations, when the first query includes multiple n-grams, query refinement n-grams that are similar to n-grams in the second query are associated with greater weight values than all of the query refinement n-grams that are similar to n-grams in the first query, excluding n-grams that are included in both queries. For example, if the first query is "Restaurants by the San Francisco pier" and the second query is "Italian restaurants," then query refinement n-grams that are similar to "Italian" or "restaurants" have greater weight values than query refinement n-grams that are similar to "San Francisco" or "pier."

In some implementations, query refinement n-grams that are similar to both one of the first query n-grams and one of the second query n-grams are associated with a greater weight value than query refinement n-grams that are similar to at most one of the first query n-grams or the second query n-grams. For example, if the first query is "Restaurants by the San Francisco pier" and the second query is "Italian restaurants," then query refinement n-grams that are similar to "restaurant" are associated with greater weight values than query refinement n-grams that are similar to "Italian," "San Francisco," or "pier."

In some implementations, uncommon query refinement n-grams are associated with a greater weight value than common query refinement n-grams, where the uncommon query refinement n-grams and the common query refinement n-grams are included in the set of query refinements (e.g., the query refinements $R_n$). For example, the uncommon query refinement n-grams may include one or more uncommon words or phrases from the language of the first query and the second query.

The commonality determination may be based on the n-grams included in the query logs. For example, the search engine determines that the n-grams that appear least frequently in the query logs are uncommon, and all other n-grams in the query logs are common.

Alternatively, the commonality determination may be based on the n-grams that are included in a set of query refinements. For example, the search engine can use the n-grams from the query refinements $R_m$ or the n-grams from the query refinements $R_o$ to determine which n-grams appear least frequently and select the least frequent n-grams as the uncommon n-grams.

In some implementations, query refinements that include an n-gram that is not in either the first query $Q_1$ or the second query $Q_2$ are associated with a score of zero. For example, rather than determine the query refinements $R_o$ as a subset of the query refinements $R_n$, the refinement scoring system associates each query refinement that includes an n-gram that is not in either the first query $Q_1$ or the second query $Q_2$ with a score of zero.

In some implementations, the refinement scoring system uses the location of a user device when scoring the query refinements $R_o$. For example, query refinements that are received from user devices in the same region as the user device that provided the first and second queries may be associated with a higher score.

In some implementations, the refinement scoring system uses a search history associated with a user device and/or a user of the user device when scoring the query refinements $R_n$. For example, query refinements that the search engine previously received from the user device, or are similar to query refinements received from the user device, are associated with a higher score than other query refinements.

In some implementations, the refinement scoring system scores the query refinements $R_n$ based on probabilities associated with each of the query refinements. For example, the refinement scoring system may retrieve the probabilities associated with the query refinements from the query logs when retrieving the query refinements $R_n$. Each of the probabilities can indicate the likelihood that the associated query refinement will be received by the search engine sequentially after the search engine receives the first query, without any intervening search queries in the same session. Alternatively, the probabilities can indicate the likelihood that the associated query refinement will be the last query received by the search engine during a session that includes the search engine receiving the first query.

In some implementations, the search engine selects a refinement query only if the highest score associated with the query refinements $R_o$ meets a threshold score. In these implementations, when the highest score does not meet the threshold score, the second query input by the user is used for the search operation.

One example of the incorrect query user interface element is the incorrect query option 126, shown in FIG. 1A. Alternatively, when verbal results are provided to a user device and the highest score is not greater than the threshold score, the user device may be configured to detect a user verbally indicating that the selected third query is incorrect.

In some implementations, when an incorrect query option is provided to a user device, if the search engine determines that the incorrect query option is selected, the search engine selects a fourth query associated with the second highest score of the query refinements $R_n$. The search engine uses the fourth query in a search operation by, for example, providing search results responsive to the fourth query to the user device. Alternatively, when the user device presents a user with search results responsive to the third query, the user device may include a first option to view search results responsive to the fourth query and a second option to view search results responsive to the second query.

In some implementations, the refinement selector selects both the query refinement associated with the highest score and the query refinement associated with the second highest score from the query refinements $R_n$ as a third and a fourth query. For example, the refinement selector provides both the third query and the fourth query to the search engine, the search engine determines third search results responsive to the third query and fourth search results responsive to the fourth query, and provides both the third search results and the fourth search results to the user device that provide the search engine with the first and second queries. In these implementations, the third search results and the fourth search results may be presented on a search results page that includes indication of which query the search results are responsive to.

Alternatively, the search engine may provide the third search results and the fourth search results to the user device, stores all of the search results in a memory of the user device, and presents only the third search results to a user. The user device provides the user with an option to view the additional search results, and, upon selection of the option, the user device retrieves the fourth search results from the memory and presents the fourth search results to the user.

In some implementations, when the refinement selector selects two or more query refinements, the selection is based on the query refinements being associated with scores greater than a threshold score. For example, the refinement selector determines that the highest score and the second highest score for the query refinements $R_n$ are greater than the threshold score and provides the highest scoring query refinement and the second highest scoring query refinement from the query refinements $R_n$ to the search engine. Further, when the top five scores for the query refinements $R_n$ are greater than the threshold score, the refinement selector may provide the query refinements associated with the top five scores to the search engine.

In some implementations, the refinement selector selects the second query in addition to a query refinement. For example, the refinement selector may provide the second query and the third query to the search engine, where the third query is selected from one of the query refinements $R_n$. The search engine may the provide search results responsive to the second query and search results responsive to the third query to a user device that provide the first and second queries.

In some implementations, the search engine receives three or more sequential queries for a single user session and determines query refinements based on all of the sequential queries. For example, the search engine receives a first query of "Restaurants in San Francisco," a second query of "Italian restaurants," and a third query of "that are open today." The search engine determines query refinements based on all of the received queries, and provides a user device with search results responsive to a query refinement, such as the query refinement "Italian restaurants in San Francisco open on Sunday" when the current day of the week is Sunday, where the user device is associated with the single user session.

In some implementations, query refinements are determined from sources other than the query logs. For example, the refinement generator may determine query refinements from books, movie scripts, or both, to name a few.

§ 4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

receiving, from a user device, a first query comprising one or more first n-grams for a user session;

receiving, from the user device, a second query comprising one or more second n-grams for the user session, the second query being different from the first query, comprising one or more second n-grams, not including all of the one or more first n-grams, and subsequent to the first query in the user session without an intervening query;

determining, from historical data, two or more query refinements, each query refinement in the two or more query refinements including at least one n-gram that is similar to one of the one or more first n-grams and at least one n-gram that is similar to one of the one or more second n-grams;

scoring each query refinement in the two or more query refinements by assigning a higher score to a first query refinement from the two or more query refinements that was similar to a query refinement received from a device associated with a user account for the user device than a second query refinement from the two or more query refinements that is not similar to a query refinement received from a device associated with the user account for the user device, each score for a specific query refinement based on one or more query refinement n-grams that are similar to one of the one or more first n-grams or one of the one or more second n-grams, the query refinement n-grams included in the specific query refinement;

selecting, based on the scores, a highest scored query refinement from the two or more query refinements; and providing, to the user device, first data for first search results responsive to the highest scored query refinement.

2. The system of claim 1, wherein scoring each query refinement in the two or more query refinements comprises scoring each query refinement in the two or more query refinements by assigning a higher score to the first query refinement from the two or more query refinements that was similar to a query refinement received from the user device than the second query refinement from the two or more query refinements that is not similar to a query refinement received from the user device associated with the user account for the user device.

3. The system of claim 2, wherein scoring each query refinement in the two or more query refinements comprises scoring each query refinement in the two or more query refinements by assigning a higher score to the first query refinement that was received from the user device than the second query refinement that was not received from the user device.

4. The system of claim 1, the operations comprising:

determining, for at least one of the two or more query refinements, a likelihood that the query refinement will be received by a search engine sequentially after the search engine receives the first query, wherein scoring each query refinement in the two or more query refinements comprises scoring each query refinement in the two or more query refinements using the likelihood that a query refinement will be received by a search engine sequentially after the search engine receives the first query.

5. The system of claim 1, wherein the first query refinement is similar to the query refinement received from a device associated with the user account for the user device when i) a first n-gram from the first query refinement and a second n-gram from the query refinement are an exact match, synonyms, alternate spellings of a same n-gram, or n-grams from a same class, or ii) when one of the first n-gram or the second n-gram is an acronym for the other n-gram, an expansion for the other n-gram, an abbreviation for the other n-gram, or a different grammatical number n-gram for the other n-gram.

6. The system of claim 1, wherein selecting the highest scored query refinement comprises:

determining whether a highest score for the highest scored query refinement satisfies a threshold score; and in response to determining that the highest score for the highest scored query refinement satisfies the threshold score, selecting the highest scored query refinement from the two or more query refinements that has the highest score.

7. The system of claim 1, wherein scoring each query refinement comprises scoring each query refinement using the historical data.

8. A non-transitory computer storage medium encoded with instructions that, when executed by one or more computers, cause the one or more computers to perform operations comprising:

receiving, from a user device, a first query comprising one or more first n-grams for a user session;

receiving, from the user device, a second query comprising one or more second n-grams for the user session, the second query being different from the first query, comprising one or more second n-grams, not including all of the one or more first n-grams, and subsequent to the first query in the user session without an intervening query;

determining, from historical data, two or more query refinements, each query refinement in the two or more query refinements including at least one n-gram that is similar to one of the one or more first n-grams and at least one n-gram that is similar to one of the one or more second n-grams;

scoring each query refinement in the two or more query refinements by assigning a higher score to a first query refinement from the two or more query refinements that was similar to a query refinement received from a device associated with a user account for the user device than a second query refinement from the two or more query refinements that is not similar to a query refinement received from a device associated with the user account for the user device, each score for a specific query refinement based on one or more query refinement n-grams that are similar to one of the one or more first n-grams or one of the one or more second n-grams, the query refinement n-grams included in the specific query refinement;

selecting, based on the scores, a highest scored query refinement from the two or more query refinements; and providing, to the user device, first data for first search results responsive to the highest scored query refinement.

9. The computer storage medium of claim 8, wherein scoring each query refinement in the two or more query refinements comprises scoring each query refinement in the two or more query refinements by assigning a higher score to the first query refinement from the two or more query refinements that was similar to a query refinement received from the user device than the second query refinement from the two or more query refinements that is not similar to a query refinement received from the user device associated with the user account for the user device.

10. The computer storage medium of claim 9, wherein scoring each query refinement in the two or more query refinements comprises scoring each query refinement in the two or more query refinements by assigning a higher score to the first query refinement that was received from the user device than the second query refinement that was not received from the user device.

11. The computer storage medium of claim 8, the operations comprising:

determining, for at least one of the two or more query refinements, a likelihood that the query refinement will be received by a search engine sequentially after the search engine receives the first query, wherein scoring each query refinement in the two or more query refinements comprises scoring each query refinement in the two or more query refinements using the likelihood that a query refinement will be received by a search engine sequentially after the search engine receives the first query.

12. The computer storage medium of claim 8, wherein the first query refinement is similar to the query refinement received from a device associated with the user account for the user device when i) a first n-gram from the first query refinement and a second n-gram from the query refinement are an exact match, synonyms, alternate spellings of a same n-gram, or n-grams from a same class, or ii) when one of the first n-gram or the second n-gram is an acronym for the other n-gram, an expansion for the other n-gram, an abbreviation for the other n-gram, or a different grammatical number n-gram for the other n-gram.

13. The computer storage medium of claim 8, wherein selecting the highest scored query refinement comprises:
   determining whether a highest score for the highest scored query refinement satisfies a threshold score; and
   in response to determining that the highest score for the highest scored query refinement satisfies the threshold score, selecting the highest scored query refinement from the two or more query refinements that has the highest score.

14. The computer storage medium of claim 8, wherein scoring each query refinement comprises scoring each query refinement using the historical data.

15. A computer-implemented method comprising:
   receiving, from a user device, a first query comprising one or more first n-grams for a user session;
   receiving, from the user device, a second query comprising one or more second n-grams for the user session, the second query being different from the first query, comprising one or more second n-grams, not including all of the one or more first n-grams, and subsequent to the first query in the user session without an intervening query;
   determining, from historical data, two or more query refinements, each query refinement in the two or more query refinements including at least one n-gram that is similar to one of the one or more first n-grams and at least one n-gram that is similar to one of the one or more second n-grams;
   scoring each query refinement in the two or more query refinements by assigning a higher score to a first query refinement from the two or more query refinements that was similar to a query refinement received from a device associated with a user account for the user device than a second query refinement from the two or more query refinements that is not similar to a query refinement received from a device associated with the user account for the user device, each score for a specific query refinement based on one or more query refinement n-grams that are similar to one of the one or more first n-grams or one of the one or more second n-grams, the query refinement n-grams included in the specific query refinement;
   selecting, based on the scores, a highest scored query refinement from the two or more query refinements; and
   providing, to the user device, first data for first search results responsive to the highest scored query refinement.

16. The method of claim 15, wherein scoring each query refinement in the two or more query refinements comprises scoring each query refinement in the two or more query refinements by assigning a higher score to the first query refinement from the two or more query refinements that was similar to a query refinement received from the user device than the second query refinement from the two or more query refinements that is not similar to a query refinement received from the user device associated with the user account for the user device.

17. The method of claim 16, wherein scoring each query refinement in the two or more query refinements comprises scoring each query refinement in the two or more query refinements by assigning a higher score to the first query refinement that was received from the user device than the second query refinement that was not received from the user device.

18. The method of claim 15, comprising:
   determining, for at least one of the two or more query refinements, a likelihood that the query refinement will be received by a search engine sequentially after the search engine receives the first query, wherein scoring each query refinement in the two or more query refinements comprises scoring each query refinement in the two or more query refinements using the likelihood that a query refinement will be received by a search engine sequentially after the search engine receives the first query.

19. The method of claim 15, wherein the first query refinement is similar to the query refinement received from a device associated with the user account for the user device when i) a first n-gram from the first query refinement and a second n-gram from the query refinement are an exact match, synonyms, alternate spellings of the same n-gram, or n-grams from the same class, or ii) when one of the first n-gram or the second n-gram is an acronym for the other n-gram, an expansion for the other n-gram, an abbreviation for the other n-gram, or a different grammatical number n-gram for the other n-gram.

20. The method of claim 15, wherein the first query refinement is similar to the query refinement received from a device associated with the user account for the user device when i) a first n-gram from the first query refinement and a second n-gram from the query refinement are an exact match, synonyms, alternate spellings of a same n-gram, or n-grams from a same class, or ii) when one of the first n-gram or the second n-gram is an acronym for the other n-gram, an expansion for the other n-gram, an abbreviation for the other n-gram, or a different grammatical number n-gram for the other n-gram.

* * * * *